United States Patent [19]

Rotem et al.

[11] Patent Number: 5,574,872
[45] Date of Patent: Nov. 12, 1996

[54] METHOD AND APPARATUS FOR CONTROLLING THE SAVING OF PIPELINES IN PIPELINED PROCESSORS DURING TRAP HANDLING

[75] Inventors: Shai Rotem, Hofit; Benny Lavi, Haifa; Michael Kagan, Maale Hagalil, all of Israel

[73] Assignee: Intel Corporation, Santa Clara, Calif.

[21] Appl. No.: 265,495

[22] Filed: Jun. 23, 1994

Related U.S. Application Data

[63] Continuation of Ser. No. 805,472, Dec. 10, 1991, abandoned.

[51] Int. Cl.⁶ .................................................. G06F 9/46
[52] U.S. Cl. ........................ 395/376; 395/733; 395/800
[58] Field of Search ........................ 364/DIG. 1, DIG. 2; 395/375, 800, 733, 734, 735, 736, 737

[56] References Cited

U.S. PATENT DOCUMENTS

| | | | |
|---|---|---|---|
| 4,338,663 | 6/1982 | Strecker et al. | 395/375 |
| 4,893,233 | 6/1990 | Denman et al. | 395/375 |
| 5,095,426 | 3/1992 | Senta | 395/375 |
| 5,119,483 | 6/1992 | Madden et al. | 395/375 |
| 5,136,696 | 8/1992 | Beckwith et al. | 395/375 |
| 5,150,468 | 9/1992 | Staplin et al. | 395/375 |
| 5,193,181 | 3/1993 | Barlow et al. | 395/375 |

*Primary Examiner*—Robert B. Harrell
*Attorney, Agent, or Firm*—Blakely, Sokoloff, Taylor & Zafman

[57] ABSTRACT

A processor and method implemented in a processor, having a pipeline and trap generation capabilities, for indicating a pipelined instruction and for generating a trap upon modification of the pipeline. Improved trap handling capabilities and improved overall system performance is provided by reducing unnecessary saving and restoring of the pipeline during certain trap handling procedures, such as those that do not modify the state of the pipeline.

12 Claims, 7 Drawing Sheets

METHOD AND APPARATUS FOR CONTROLLING THE SAVING OF PIPELINES IN PIPELINED PROCESSORS DURING TRAP HANDLING

This is a continuation of application Ser. No. 07/805,472, filed Dec. 10, 1991 now abandoned.

BACKGROUND OF THE INVENTION

1. Field of the Invention

The present invention relates to pipelined processors. More particularly, this invention relates to means and method for determining whether the pipeline in a processor should be saved while servicing a processor trap.

2. Background of Related Art

Modem processors have incorporated pipelining as a means for increasing the performance of computer systems. Pipelining is an implementation technique wherein multiple instructions are overlapped in execution. A pipelined architecture machine comprises multiple stages. Each stage in the pipeline completes a pan of execution of the instruction. The work of each instruction is broken into smaller portions, each of which takes a fraction of time needed to complete the entire instruction. The stages are connected to each other in order to form a pipe, instructions entering at one end, being processed through each of the stages, and exiting at the other end.

In a pipelined architecture machine, instructions are executed on a piece-meal basis. In order to execute an instruction, it may take several clock cycles for the instruction to complete operation. Each stage of the execution updates various contents of memory and registers in the machine during execution. If an interrupt or a trap occurs during instruction execution, the trap must be serviced, and pipeline execution must be restarted at the place where it was halted. This requires an implementation to restore the pipeline and any registers and/or memory to the state where instruction execution was halted. This must be done because, by the the time the trap is encountered, several other instructions will be in the pipeline at various stages of execution. Therefore, a variety of attempts have been made to preserve the contents of the pipeline in order to service traps or interrupts which occur during execution.

One technique for trap handling involves saving all the contents of the pipeline prior to servicing the trap. A disadvantage of saving the entire pipeline prior to servicing the trap is the overhead resulting from saving of the pipeline. The saving of the entire pipeline prior to servicing the trap requires that the processor use memory to save all the pipes. It also takes some time to save all the pipes. In a high-performance processor which has multiple-stage pipeline, the saving operation may consume significant amounts of memory and several clock cycles of processor execution. In addition to saving the entire pipeline prior to servicing the trap, the pipelines must be restored to their original state prior to resuming operation. This involves fetching each of the memory locations from memory and advancing the pipeline one stage until the pipes are restored to their original state. This process also takes a substantial period of time. The combination of saving and restoring the pipelines for servicing traps thus slows overall performance of the processor.

In some situations, saving the pipeline may not be necessary. For instance, certain architectures support both pipelined instructions as well as so-called "scalar" or non-pipelined instructions. When executing scalar instructions, the contents of the pipeline may not be desired to be saved. Also, some trap handling techniques may not modify the pipes or registers at all. Therefore, in some instances, the resulting overhead from saving and restoring the pipelines prior to trap servicing is not required. No means for distinguishing between instructions which do not require the saving of the processor pipelines for servicing traps is provided in the prior art.

SUMMARY AND OBJECTS OF THE INVENTION

One of the objects of the present invention is to provide a means in a pipelined architecture computer for indicating the use of a pipeline in a computer.

A second object of the present invention is to provide a means in a pipelined architecture computer for indicating whether a trap should be generated upon the execution of an instruction using the pipelines.

A third object of the present invention is to provide a means for avoiding unnecessarily saving and restoring of pipelines during servicing traps in a pipelined computer.

These and other objects are provided for by a method in a processor of handling a first trap which occurs while executing a first instruction. The processor has a pipeline, a means for indicating an instruction which uses the pipeline (in a preferred embodiment the PI bit of the extended processor status register [EPSR]), a means for generating a trap on use of the pipeline, and a means for activating the pipeline use trap generation means (in a preferred embodiment the PT bit of the EPSR). The trap handling method comprises saving the pipeline instruction indication means and the means for activating the pipeline use trap generation means. Then, it is determined if the pipeline instruction indication means is set, and if so, activating the means for activating the pipeline use trap generation means. Then, the pipeline instruction indication means is cleared and the handling of the the first trap is continued. If a second trap is generated during handling of the first trap, then determining if the pipeline instruction indication means and the means for activating the pipeline use trap generation means are set. In a preferred embodiment, this will determine if the trap was caused by the PT bit in the EPSR register which means that the pipeline was attempted to be modified. If so, the means for activating the pipeline use trap generation means (PT) and the pipeline instruction indication means (PI) are cleared and the contents of the pipeline are saved. The remainder of handling for the first trap is performed, and when complete, the contents of the pipeline, the pipeline instruction indication means and the means for activating the pipeline use trap generation means (if saved) are restored and execution is resumed at the first instruction. This method is generally used, in a preferred embodiment, when it is known that the trap handling method does not modify the pipeline in the processor and it saves the requisite overhead in computing time and memory use from saving the pipeline every time a trap is encountered.

These and other objects of the present invention are provided for by a method of handling a trap generated by a first instruction in a processor having a pipeline and a means for indicating the use of the pipeline (in a preferred embodiment the PI bit of the extended processor status register [EPSR]). This method comprises determining whether the pipeline use indication means (PI bit) is activated. If the PI bit is activated, then the state of the pipeline is saved, wherein the pipeline is in a first state. The remainder of the trap handling is performed and if the contents of the pipeline were saved then the pipeline is restored to the first state and execution is resumed at the first instruction. This method is used, in a preferred embodiment, when it is assumed that the trap handler does modify the pipeline and therefore the pipeline and the flags are always saved, sometimes unnecessarily.

These and other objects of the present invention are provided for by a processor which comprises a pipeline and a trap generation means. The processor further comprises a means for jumping to a trap servicing routine operative upon activation of the trap generation means, and a means for indicating the execution of a instruction which uses the pipeline. Finally the processor comprises a means for activating the trap generation means on pipeline modification and a means for activating the means for activating the trap generation means upon pipeline modification. This therefore provides improved trap handling capabilities which may be generated by end-users. These improvements may improve overall system performance by eliminating unnecessary saving and restoring of processor pipelines during trap handling.

BRIEF DESCRIPTION OF DRAWINGS

The present invention is illustrated by way of example and not limitation of the figures of the accompanying in which like references indicate like elements and in which.

DETAILED DESCRIPTION

An apparatus and methods for indicating saving of a pipeline in a processor employing a pipelined architecture are described. In the following description, for the purposes of explanation, numerous specific details are set forth such as circuitry, signal names, registers, and methods in order to provide a thorough understanding of the invention. It will be obvious, however, to one skilled in the an that the invention may be practiced without these specific details. In other instances, well known circuits, structures, and techniques have not been shown in detail in order to not unnecessarily obscure the present invention.

Figure 1:
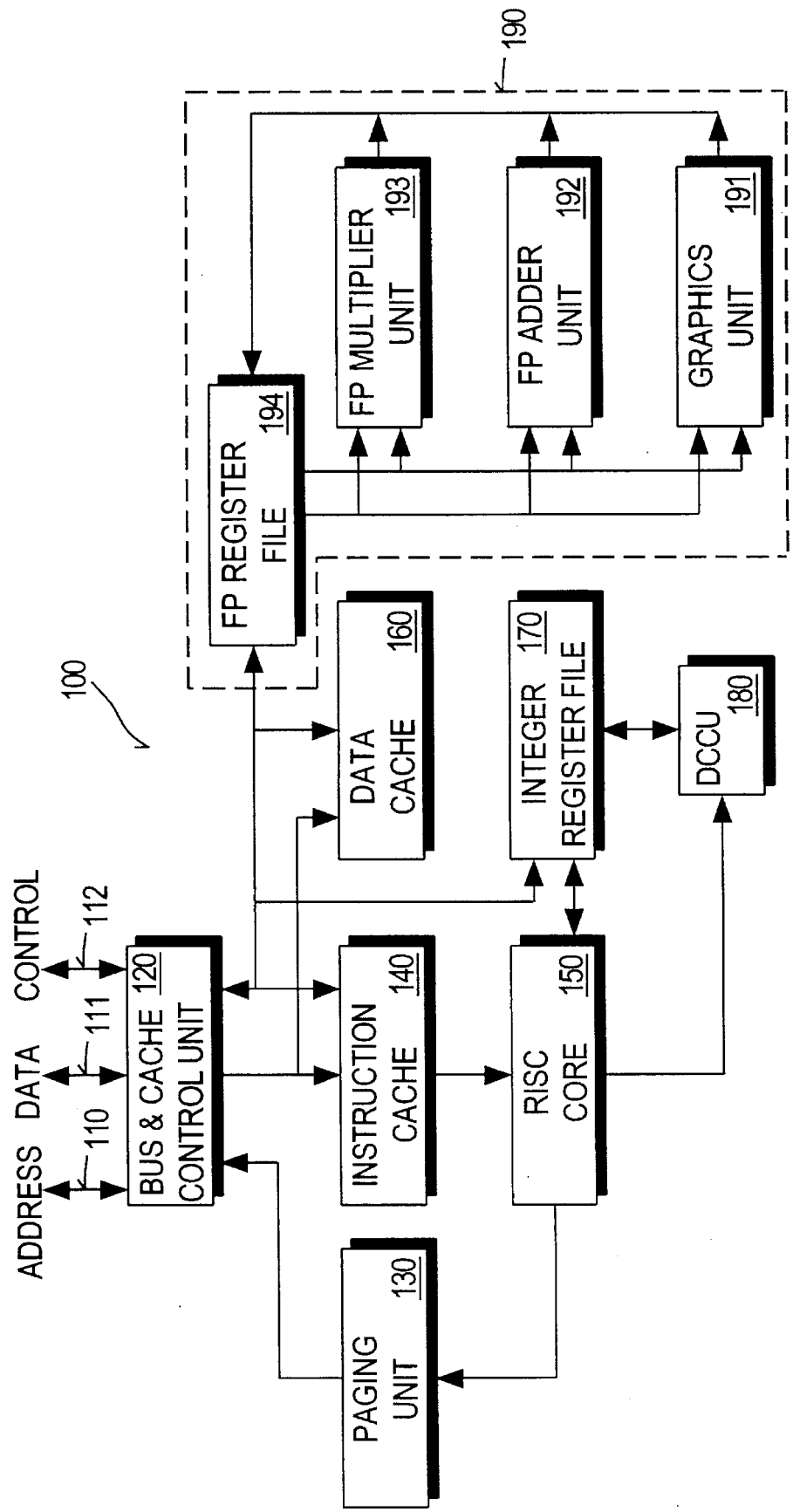
FIG. 1 shows a block diagram of a computer system of the preferred embodiment.

The processor which is used in the preferred embodiment is shown in FIG. 1. Processor 100 comprises address lines 110, data lines 111, and control lines 112. These are coupled to bus and cache control unit 120 which is used to redirect address and data information internally in processor 100. Processor 100 comprises an instruction cache 140 and data cache 160 for temporarily storing information processed within processor 100. Further, processor 100 comprises a paging unit 130, and a reduced instruction set computer (RISC) core instruction unit 150 which is used for processing and execution of instructions. Further, processor 100 comprises a detached concurrency control unit (DCCU) 180 which expedites loop level parallelism and synchronization in multiprocessing systems employing processor 100. Registers and other internal control information are maintained in a series of registers known collectively as the integer register file 170.

To enable arithmetic operations, processor 100 comprises a vector floating-point unit (VFPU) 190 which has four separate components as shown in FIG. 1. VFPU 190 comprises a graphics unit 19 1 which is used for dedicated graphics operations for manipulating pixels and other graphics information for display. Further, VFPU 190 comprises a floating-point adder unit 192 and a floating-point multiplier unit 193 for performing arithmetic operations on data processed by processor 100. Lastly, VFPU 190 comprises a floating-point register file 194 which contains all the necessary internal registers and pipelines for processor 100. A more detailed representation of processor 100 along with the corresponding control registers and general purpose registers is shown in FIG. 2.

Figure 2:
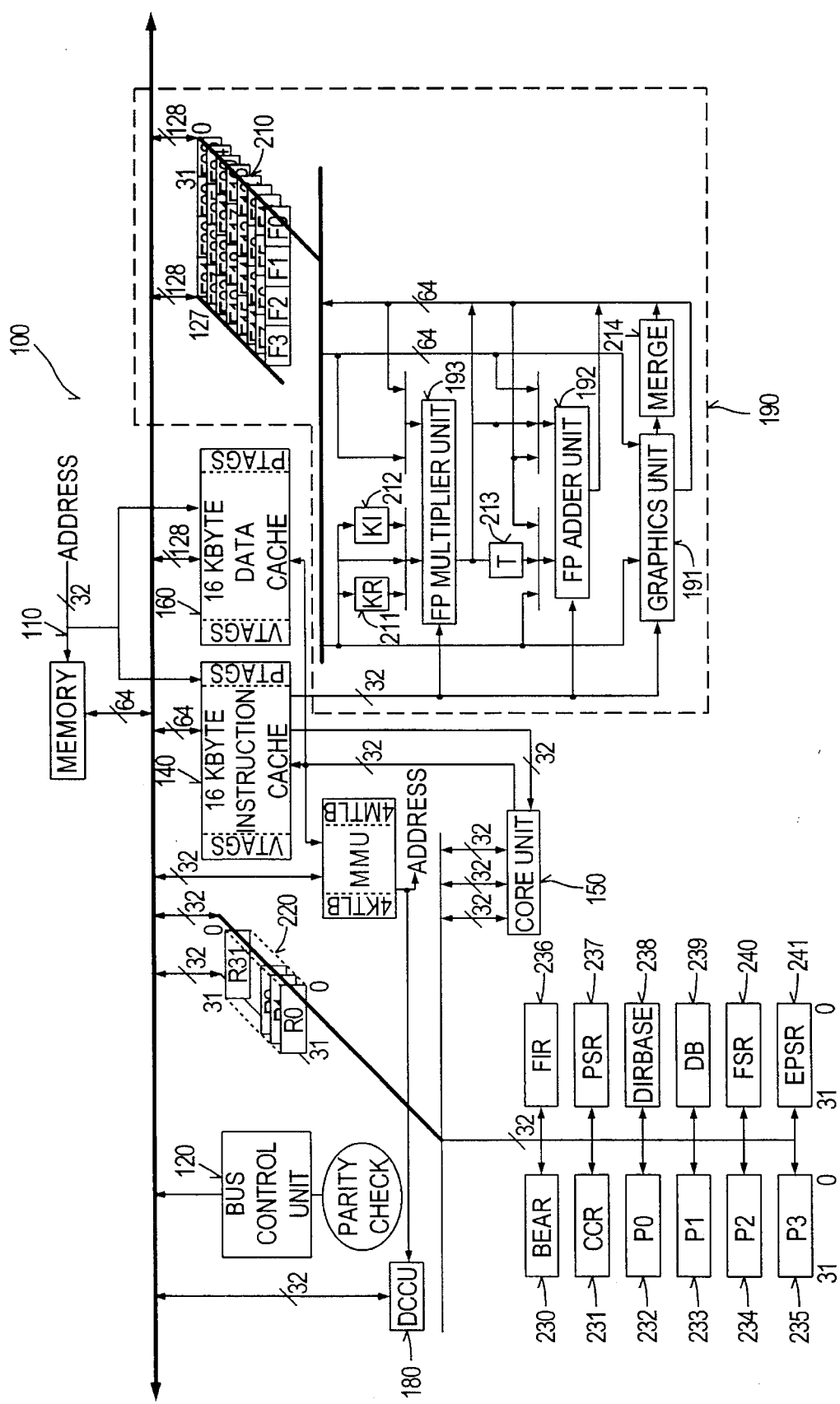
FIG. 2 shows a more detailed diagram of the computer system of the preferred embodiment including the vector floating-point unit (VFPU) and various registers which must be saved during trap servicing.

As shown in FIG. 2, processor 100 comprises several control registers which will now be discussed. Processor 100 comprises registers 230 through 241 which are used for controlling the operation of processor 100. Further, processor 100 contains 32 integer general purpose registers 220, each 32 bits in width, and 32 general purpose floating-point registers 210, each 32 bits wide which are contained in the vector floating-point unit (VFPU) 190. In addition to the general purpose and control registers for processor 100, VFPU 190 comprises several special purpose registers. These are the KR register 211, the KI register 212, the T register 213, and the merge register 214. KR 211, KI 212, and T register 213 are used for special purpose dual operation floating-point instructions which initiate both an adder and a multiplier operation performed by units 193 and 192. KR 211, KI 212, and T 213 registers can store values from one dual operation instruction and supply them as inputs to the subsequent dual operation instruction. Merge register 214 is used by graphics instructions which are executed by graphics unit 191. Merge register 214 accumulates the results of multiple addition operations that use color intensity values from pixels or distance values from a Z buffer as operands. The accumulated results can then be stored in one 64-bit operation.

Processor 100 of the preferred embodiment uses a pipelined architecture. There are four pipelines in the preferred embodiment: one for multiplier unit 193; one for adder unit 192; one for graphics unit 191; and one for the loader (not shown). The pipeline for adder unit 192 has three stages. Multiplier unit 193 has a pipeline with variable stages depending on the precision of the source operands in the pipeline. For double precision operands the multiplier pipeline has two stages, and for single precision operands the multiplier pipeline has three stages. Graphics unit 191 has a single stage pipeline for all precisions, and the loader has a three stage pipeline for all precisions. Pipelining as implemented in the preferred embodiment is discussed with reference to FIG. 3.

Figure 3:
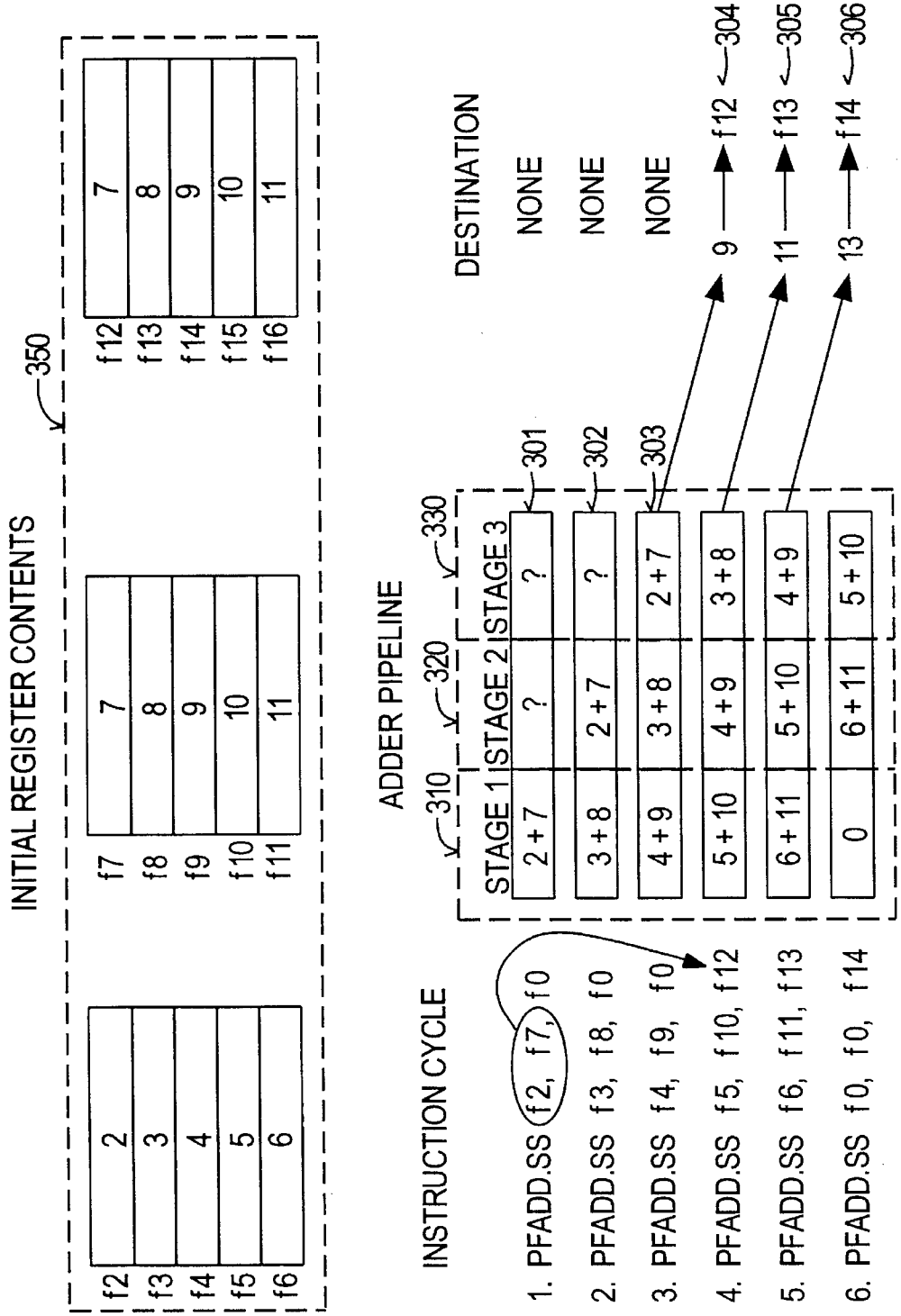
FIG. 3 shows an example of pipelining used in the preferred embodiment.

As shown in FIG. 3, the initial register contents in the example are shown as 350 in FIG. 3. In the example shown in FIG. 3, a three stage pipelined add operation is represented. At instruction cycle 1, step 301, wherein the integers contained in registers f2 and f7 are added together, the contents of those registers enter stage 1310 of the pipeline. As each instruction cycle is subsequently processed at steps 302 and 303, the contents of those registers pass down through the stages 2 and 3, 320 and 330, respectively. For single precision add operations performed as shown in FIG. 3, it is not until the fourth instruction cycle 304 that the contents of the two registers that are added are placed into the resulting register f12 at step 304. For single precision add operations, with the three stage example shown in FIG. 3, the results of the initial add operation performed at step 301 are not available until step 304, four instruction cycles later. This holds true for all single precision operations using the adder for the adder pipeline. This example holds true for all four of the pipelines used in the preferred embodiment, however, in the case of multiplier unit 193, mixed precision operations should not be performed until the pipeline is flushed. This is because the number of stages in the pipeline varies in multiplier 193 according to the precision of the source operands. In addition, scalar operations should not be performed by any of the units doing pipelining until the pipeline has been flushed because scalar operations clear out the pipeline (for instance, a scalar add clears the adder pipeline). Therefore, before executing any scalar or non-pipelined operations, the pipeline should be flushed by the number of stages the appropriate pipeline contains using a series of dummy operations. One such dummy operation is shown at step 306 in FIG. 3. Yet another consideration is that pipelined instructions do not have to occur in consecutive clock cycles. Each corresponding pipeline for each of the units is frozen until a next pipeline or scalar operation is executed for that unit. Therefore, pipeline operations may be executed for one unit at intermittent clock cycles, as long as no intervening operations which modify the pipeline are executed.

Figure 4:
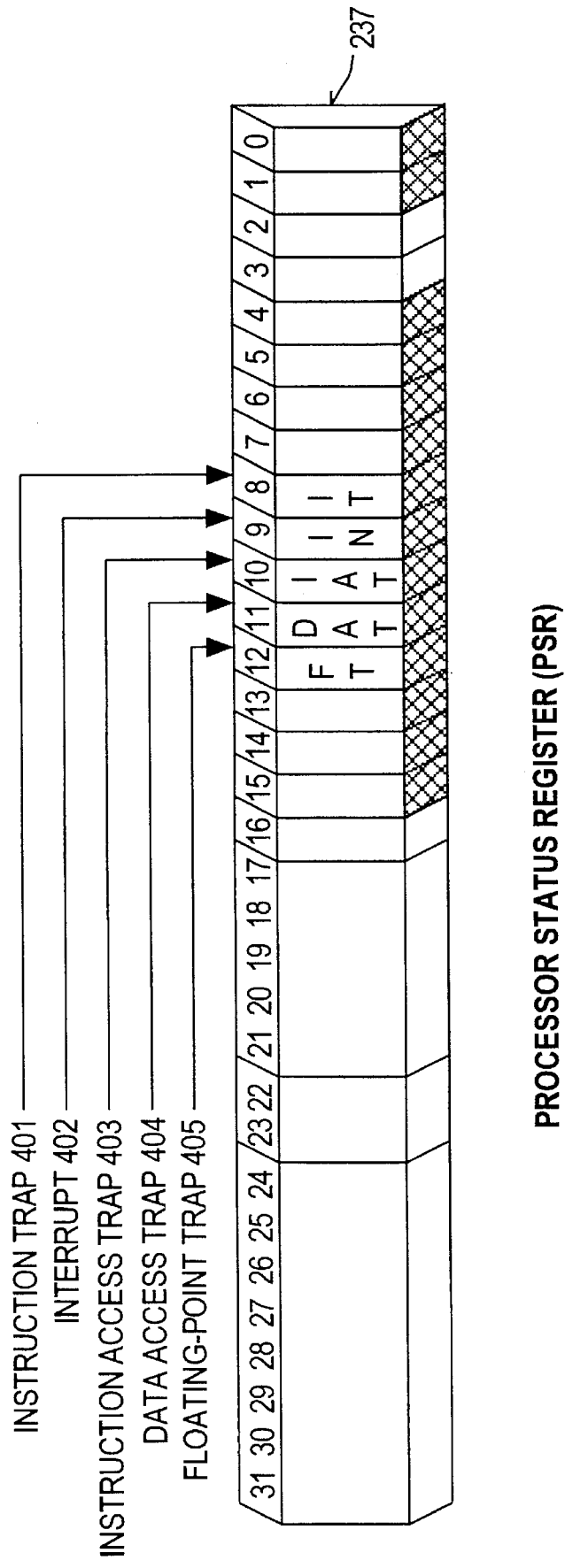
FIG. 4 shows the processor status register (PSR) of the preferred embodiment.

Although all of the registers 230 through 241 are required for keeping track of the status of current processor execution, only certain of these will be discussed here. The first of these is the processor status register (PSR) 237 which is shown in FIG. 2 and discussed in more detail with reference to FIG. 4. PSR 237 contains miscellaneous state information for the current process. This status information includes, among other things, whether a data access trap has occurred, a condition code, interrupt mode, whether the processor is executing in user or supervisor mode, the previous interrupt mode the previous user mode, etc. Some flags which are especially useful to the preferred embodiment of the present invention include trap flags 401 through 405. Instruction trap (IT) flag 401 is used for any type of software trap or instruction fault which suspends processing by processor 100. Floating-point fault flag 405 (FT) is used for indicating floating-point source and result exceptions as well as underflows and overflows of registers 210. Instruction access fault (IAT) flag 403 is used for indicating address translation exceptions which occur during instruction fetches. Data access fault (DAT) flag 404 is used for indicating load/store address translation exceptions, misaligned operand addresses, or operand address matches for addresses which are contained within DB (data breakpoint) register 239. Interrupt register 402 is used for indicating various other types of interrupts such as parity error faults, bus error faults, or external interrupts indicated on an interrupt pin of processor 100.

When a trap occurs, as indicated by any of the foregoing flags, execution of the current instruction is aborted. Except for bus and parity errors, the instruction is restartable by transferring execution to a trap handler. In a trap handler which may be executed, service interrupts generated by any of the foregoing flags must save the current states of all the registers 230 through 241, general purpose registers 220, general purpose floating-point registers 210, KR register 211, KI register 212, T register 213, merge register 214, and the pipelines for units 191 through 193 and the loader unit. These items are saved in an area known as the "context data structure" which is a user-determined area in memory, to allow servicing of the trap and/or restart of processor 100 at the place where execution was suspended. Because all the pipes must be saved, dummy instructions must be executed for each of the floating-point pipelines for the multiplier unit 193, adder unit 192, the load pipeline, and graphics pipeline 191. In addition, the status registers KR 211, KI 212, T 213, and merge 214 must all be stored. For the adder pipeline, three dummy instructions must be executed in order to correctly save the contents of the adder pipeline and T register 213. In addition, for the multiplier pipeline, depending on the precision and therefore the number of stages (which is indicated by MRP bit 601 shown in FIG. 6) either two or three dummy instructions must be executed in order to flush the pipeline for the multiplier. For the load pipeline, three dummy instructions must be executed, and for the pipeline of graphics unit 191, only one dummy instruction must be executed in order to flush out the graphics pipeline.

Saving and restoring all of the pipelines in the preferred embodiment requires a substantial amount of processing overhead, as well as consumes a substantial amount of memory. In most prior an systems, saving of the pipelines in memory was always performed, sometimes unnecessarily if the trap handler did not modify the contents of the pipes. Therefore, the preferred embodiment has implemented a mode wherein it may be indicated that pipelined instructions are being executed, and/or the pipeline should be saved when servicing the trap. This is provided by two flags in the extended processor status register (EPSR) 241 shown in FIG. 2 and discussed in more detail with reference to FIG. 5.

Figure 5:
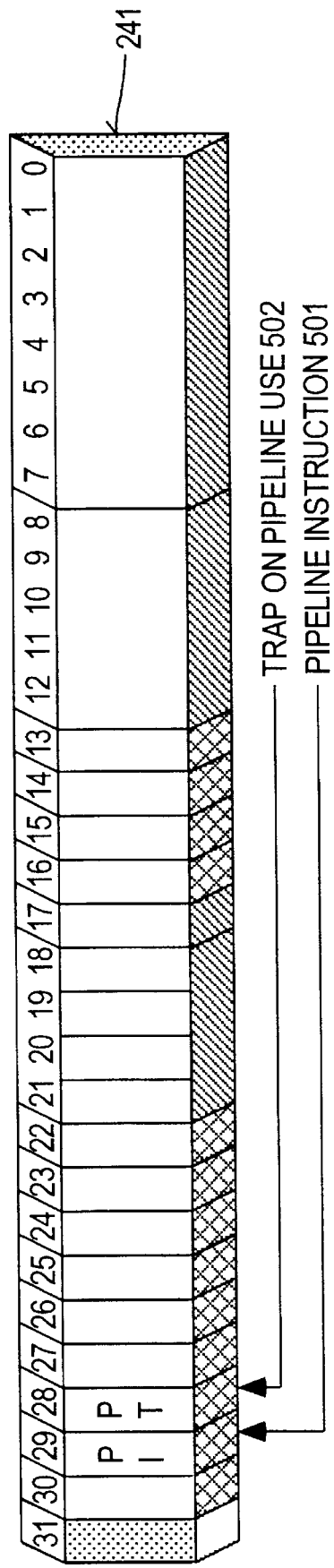
FIG. 5 shows the extended processor status register (EPSR) of the preferred embodiment.

As shown in FIG. 5, EPSR register 241 comprises two bits; pipelined instruction (PI) 501; and trap on pipeline use (PT) 502. These flags are provided to help the trap handler avoid unnecessarily saving and restoring the pipelines in processor 100 during trap servicing. This will avoid the unnecessary processing overhead and memory use of the trap handler during certain trap handling operations. PT 502 (trap on pipeline use bit 28) indicates to processor 100 that a trap should be generated when an instruction is executed which modifies the pipeline. PI 501 is set when processor 100 executes an instruction that uses any of the pipelines. This includes any pipeline load operations. PT 502 is set and cleared only by software. It can be used by the trap handler to avoid unnecessary saving and restoring of the pipelines. When a trap due to PT 502 occurs, the floating-point operation has not started, and the pipelines have not been advanced. Such a trap also sets the IT bit of PSR 237. The behavior of PI 501 (pipelined instruction bit 29) depends on the setting of PT 502. If PT 502 equals zero, processor 100 sets PI 501 when any pipelined instruction is executed. If PT 502 equals one, processor 100 sets PI 501 and traps when it decodes any instruction that uses the pipes, whether scalar or pipelined.

Figure 6:
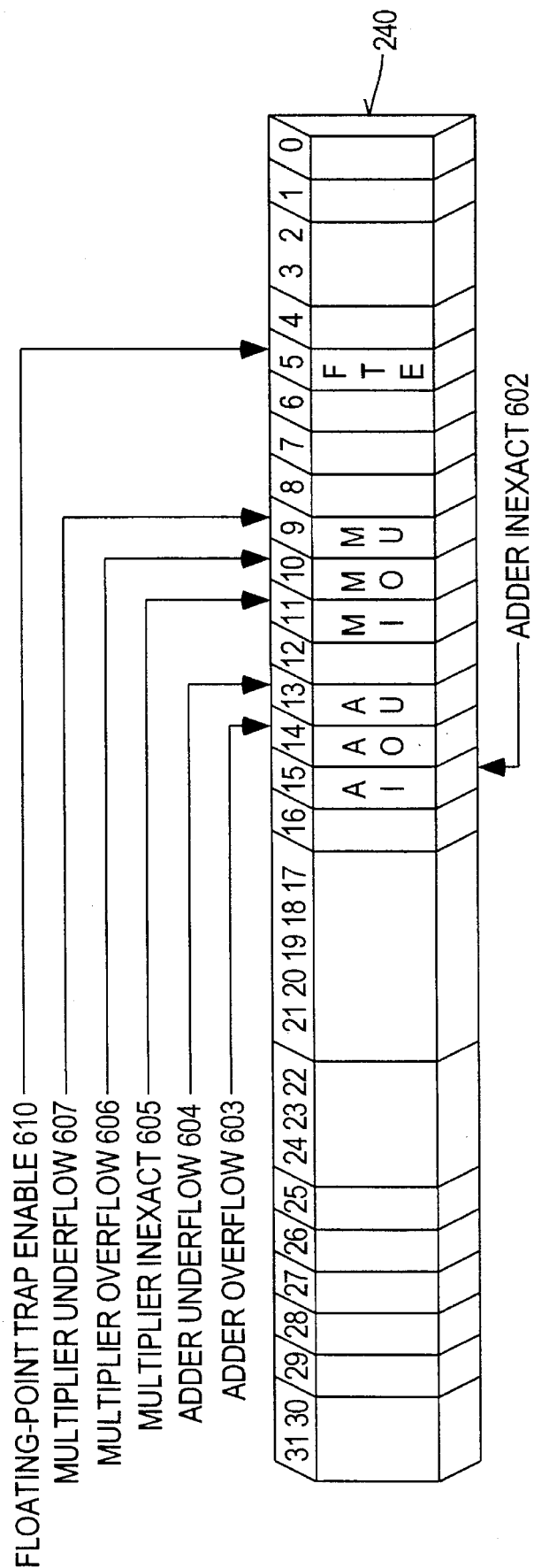
FIG. 6 shows the floating-point status register (FSR) of the preferred embodiment.

Upon invocation for any reason (if any of the interrupt flags 401 through 405 are set in PSR register 237), the execution of a trap handler commences. When a trap occurs and a jump to trap handler is performed, the trap handler first examines the floating-point status register (FSR) 240 as shown in FIG. 2 and as shown in more detail in FIG. 6. The trap handler first examines the floating-point trap enable bit 610 as shown in FIG. 6 to determine whether a floating-point trap has been enabled. If so, then the trap handler examines any of the floating-point trap flags 602 through 607 to determine whether in fact a floating-point trap is pending. If so, then all the pipelines are saved prior to servicing the current trap.

If no pending trap exists, however, the handler uses only PI flag 501, or PI flag 501 in conjunction with PT flag 502. The latter option will now be discussed. This option is used in the preferred embodiment when it is assumed that the trap handler does not usually modify the pipes. This case is used to avoid unnecessary saving and restoring of the pipes. When using both the PI flag 501 and PT flag 502, the trap handler saves the state of the EPSR register 241, but does not save the pipelines. If PI flag 501 is found set (which means that the interrupted code needs the state information in the floating-point pipelines), the trap handler sets PT 502 and clears PI 501 and continues with trap processing. Changing of information contained within control registers such as 230 through 241, 211,212, 213, and 214 is performed by using a special instruction provided by the preferred embodiment known as "st.c" (store in control register). PI flag 501 is set if the pipelines are used, even when executing a scalar instruction. Therefore, both IT flag 401 in PSR register 237, as well as PI flag 501 in EPSR register 241 will be set. If both PI flag 501 and PT flag 502 are set in EPSR register 241, then PT 502, PI 501, and IT 401 in PSR register 237 are cleared. The pipes are saved, and execution of the trap handler resumes from the instruction which caused the trap. When the trap has been serviced, the trap handler restores the pipes if they were saved, and the PI and PT flags 501 and 502 are restored to their values before the trap. In summary, saving and restoring of the pipes, which is assumed to not occur very often, is only performed when PT 502 in EPSR register 241 is set or is equal to one and the pipes are subsequently modified during trap handling.

A second option in the preferred embodiment for implementation of trap handlers using the preferred embodiment is to use only PI flag 501. PT 502 is always set to zero. In the second option, the trap handler saves PI 501, saves the pipelines if PI 501 is set, indicates that the pipelines were saved, and clears PI 501. Trap handling then proceeds normally, servicing the trap. At the end of trap handling, the trap handler restores the pipes if they were saved, and restores PI 501 to its value before the trap. Using this method, the pipes are sometimes saved and restored unnecessarily if the trap handler does not use the pipes. This method is typically used when the trap handler is known to use the pipes of processor 100 because it avoids the unnecessary setting and checking of PI flag 501 and PT flag 502 during trap handling which consumes some processor overhead in itself. As opposed to the former method, this method assumes that most trap handling conditions use the pipes.

Figure 7:
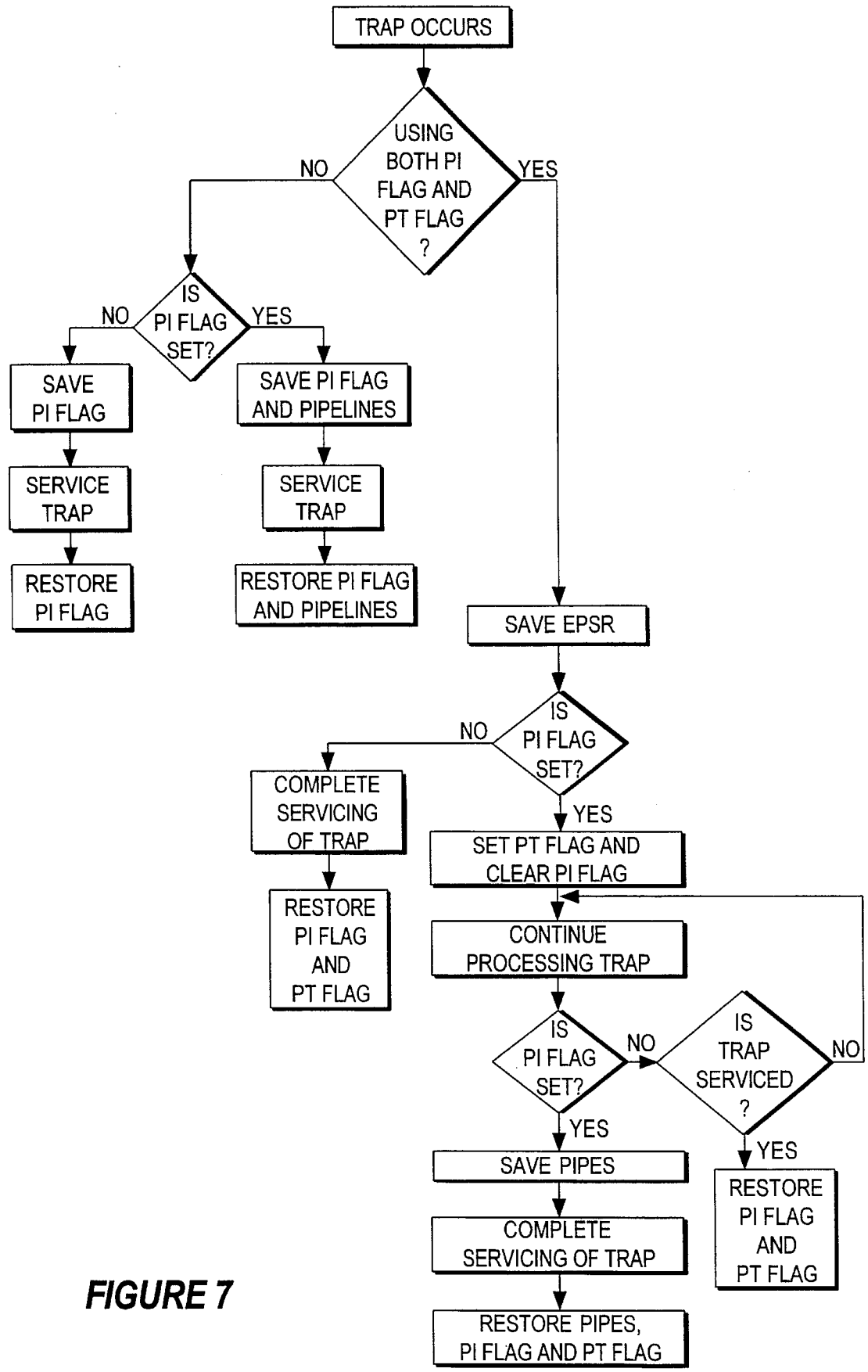
FIG. 7 shows a flowchart summarizing the steps of the preferred embodiment of the present invention.

FIG. 7 is a flowchart summarizing the steps of the preferred embodiment of the present invention as discussed above.

Thus, an invention for indicating whether pipelines should be saved and/or restored has been described. Although the present invention has been described particularly with reference to FIG. 1 through 6, it will be apparent to one skilled in the art that the present invention has utility far exceeding that disclosed in the figures. It is contemplated that many changes may be made, by one of ordinary skill in the art, without departing from the spirit and scope of the present invention as disclosed above.

What is claimed is:

1. A method in a processor performed during handling of a first trap which occurs while executing a first instruction, the processor having a pipeline with a plurality of stages, a first indicator denoting an instruction which uses said pipeline, and a second indicator denoting whether to generate a trap on use of said pipeline, said method comprising the steps of:

(a) saving said first indicator and said second indicator;

(b) activating said second indicator and clearing said first indicator and continuing said handling of said first trap;

(c) clearing said first indicator and said second indicator and saving said pipeline responsive to a second trap being generated during said handling of said first trap;

(d) continuing said handling of said first trap;

(e) restoring said first indicator and said second indicator;

(f) restoring said pipeline; and (g) resuming execution at said first instruction.

2. A method performed during handling of a trap generated by a first instruction in a processor having a pipeline and a means for indicating use of the pipeline by an instruction, the method comprising the steps of:

(a) determining whether said means for indicating use of the pipeline is activated;

(b) if said means for indicating use of the pipeline is activated, then saving a first state of said pipeline, otherwise continuing said handling of said trap absent said saving;

(c) completing said handling of said trap;

(d) if said means for indicating use of the pipeline was activated then restoring the pipeline to said first state, otherwise leaving said pipeline unmodified; and (e) resuming execution at said first instruction.

3. The method of claim 2 wherein said completing step (c) modifies said pipeline.

4. The method of claim 2 wherein said pipeline comprises a plurality of stages.

5. The method of claim 2 wherein said pipeline comprises a multiplier pipeline, an adder pipeline, a graphics pipeline, and a loader pipeline.

6. An apparatus comprising:

a floating point unit which executes instructions in a pipeline; said pipeline having a plurality of pipeline stages;

a processor status register having a plurality of bits, the plurality of bits including a first bit; and a trap handler for servicing traps, said trap handler also for saving the pipeline during servicing of a trap responsive to said first bit being in a first state, said trap handler for servicing the trap without saving the pipeline responsive to said first bit being in a second state.

7. The apparatus of claim 6 wherein said first state comprises said first bit being set.

8. A method performed during trap handling in a processor, the processor having a pipeline comprising a plurality of stages, wherein instructions being executed by said processor are passed from stage to stage of said plurality of stages on consecutive clock cycles, said method comprising the steps of:

(a) suspending execution at a first instruction and determining whether said first instruction is a pipeline instruction;

(b) if said first instruction is the pipeline instruction, then saving a first state of said pipeline, otherwise continuing said trap handling absent said saving;

(c) performing the trap handling;

(d) if said first instruction is the pipeline instruction then restoring the pipeline to said first state, otherwise keeping said pipeline unmodified; and (e) resuming execution at said first instruction.

9. An apparatus comprising:

a floating point unit which executes instructions in a pipeline, said pipeline having a plurality of pipeline stages;

a processor status register having a plurality of bits, wherein a first bit of the plurality of bits has one of either a first state or a second state, said first state indicating that an instruction being executed uses the pipeline, said second state indicating that the instruction being executed does not use the pipeline; and a trap handler for servicing traps, said trap handler also for saving information in the plurality of pipeline stages during servicing of a trap responsive to said first bit being in said first state, said trap handler also for servicing the trap without saving the information in the plurality of pipeline stages responsive to said first bit being in said second state.

10. A method for handling a trap generated by an instruction in a processor, the method comprising the steps of:

(a) checking whether a first bit in a processor status register is set;

(b) saving both the first bit and a pipeline in the processor if the first bit is set, otherwise saving the first bit and not saving the pipeline if the first bit is not set;

(c) completing handling of the trap;

(d) restoring the first bit; and (e) restoring the pipeline if the pipeline was saved in the saving step (b), otherwise not restoring the pipeline.

11. A method for handling a trap generated by an instruction in a processor, the method comprising the steps of:

(a) saving a state of each bit of a plurality of bits in a processor status register;

(b) setting a first bit of the plurality of bits and clearing a second bit of the plurality of bits;

(c) saving a state of a pipeline in the processor responsive to the second bit becoming set due to continued handling of the trap, otherwise continuing handling of the trap without saving the state of the pipeline;

(d) restoring the state of each bit of the plurality of bits; and (e) restoring the state of the pipeline if the state of the pipeline was saved in the saving step (c), otherwise not restoring the state of the pipeline.

12. An apparatus comprising:

a floating point unit which executes instructions in a pipeline, said pipeline having a plurality of pipeline stages;

means for indicating an instruction which uses said pipeline; and means for indicating a trap is to occur if said pipeline is used.

* * * * *

UNITED STATES PATENT AND TRADEMARK OFFICE
CERTIFICATE OF CORRECTION

PATENT NO. : 5,574,872
DATED : November 12, 1996
INVENTOR(S) : Rotem et al.

It is certified that error appears in the above-identified patent and that said Letters Patent is hereby corrected as shown below:

In column 1 at line 22 delete "pan" and insert --part--

In column 3 at line 56 delete "an" and insert --art--

In column 5 at line 66 delete "handier" and insert --handler--

In column 6 at line 30 delete "handier" and insert --handler--

In column 7 at line 40 delete "handier" and insert --handler--

Signed and Sealed this

Eleventh Day of March, 1997

*Attest:*

BRUCE LEHMAN

*Attesting Officer*     *Commissioner of Patents and Trademarks*